United States Patent [19]

Fremont

[11] 4,332,748
[45] Jun. 1, 1982

[54] POLYETHYLENE RECOVERY FROM BROKE

[75] Inventor: Henry A. Fremont, Wyoming, Ohio

[73] Assignee: Champion International Corporation, Stamford, Conn.

[21] Appl. No.: 155,606

[22] Filed: Jun. 2, 1980

Related U.S. Application Data

[63] Continuation-in-part of Ser. No. 709,898, Jul. 29, 1976, abandoned.

[51] Int. Cl.³ .............................................. B01J 2/06
[52] U.S. Cl. ...................................... 264/11; 521/47; 162/4; 162/5; 162/191
[58] Field of Search ............... 264/11; 260/2.3; 162/4, 162/5, 191

[56] References Cited

U.S. PATENT DOCUMENTS

| | | | |
|---|---|---|---|
| 3,051,609 | 8/1962 | Grossman et al. | 162/5 |
| 3,226,343 | 12/1965 | Rhodes | 260/2.3 |
| 3,449,291 | 6/1969 | Lerman et al. | 260/42.21 |
| 3,914,354 | 10/1975 | Ueki et al. | 264/13 |

*Primary Examiner*—James R. Hall
*Attorney, Agent, or Firm*—Evelyn M. Sommer

[57] ABSTRACT

A process of making polyethylene pellets from polyethylene broke comprising forming a polyethylene solvent-free aqueous slurry of said broke and defibering said slurry to produce a polyethylene slurry having a fiber to solid polyethylene ratio of no more 1:20, dehydrating said polyethylene slurry to less than about 15% water, and pelletizing the polyethylene.

6 Claims, 1 Drawing Figure

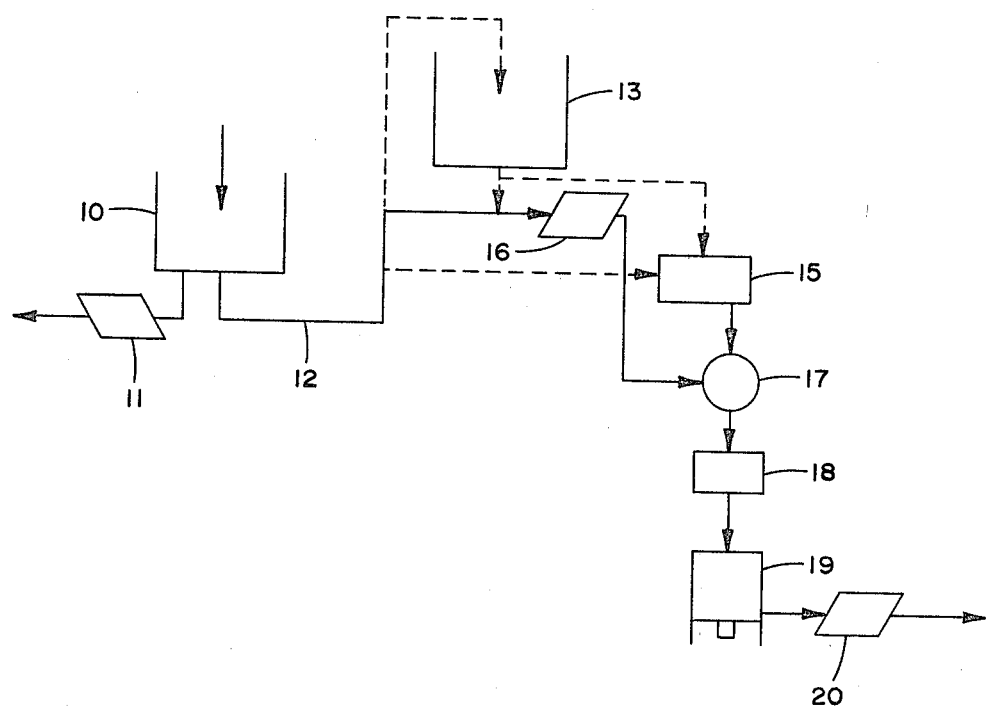

POLYETHYLENE RECOVERY FROM BROKE

CROSS-REFERENCE TO RELATED APPLICATION

The instant application is a continuation-in-part of U.S. Application Ser. No. 709,898, filed July 29, 1976 now abandoned.

BACKGROUND OF THE INVENTION

Polyethylene is a plastic material that is commonly applied to paper for use as a barrier type of coating. Paperboard coated with polyethylene has chemical, tear and puncture resistance, heat sealability, gas, moisture and grease resistance, and durability on folding. For these reasons, polyethylene coated paperboard is used extensively to manufacture various types of containers, such as milk cartons as well as a variety of other paper products.

The trim and scrap from manufacturing coated paperboard as well as the trim from the different products made from polyethylene coated paperboard is known in the art as "polyethylene broke". Polyethylene broke from the manufacture of milk cartons contains generally about 8% to 12% by weight of polyethylene. Normally, polyethylene broke is chopped, baled and fed into a hydropulper where the fiber content of the broke is discharged through screens as an aqueous slurry, and after cleanup, is reused in paperboard manufacture. The polyethylene content of the broke, together with some fiber that is present, is also discharged from the hydropulper as a slurry. Because of the fiber content, however, the polyethylene scrap is not particularly suited for recycling. Consequently, the separated polyethylene material usually is dewatered and then transported to a landfill where it is dumped.

Efforts to recover the polyethylene in an economic manner have not been successful. U.S. Pat. No. 3,226,343 discloses a chemical solvent process of recovering polyethylene from cellulosic fibers, but here special equipment and processing costs have rendered the process economically unsuitable. There is also the problem of special handling resulting from the use of solvents.

SUMMARY OF THE INVENTION

The present invention provides a process of recovering commercially usable polyethylene from polyethylene broke in an economic manner eliminating the use of polyethylene solvents and the problems that result from such use.

Briefly stated, the invention comprises the process of making polyethylene pellets from polyethylene broke comprising forming a polyethylene solvent-free aqueous slurry of said broke and defibering said slurry to produce a polyethylene slurry having a fiber to solid polyethylene ratio of no more than 1:20, dehydrating said polyethylene slurry to less than about 15% water, and pelletizing the polyethylene.

BRIEF DESCRIPTION OF THE DRAWINGS

The single FIGURE of drawing is a schematic diagram of an apparatus system suitable for carrying out the process of the instant invention.

DETAILED DESCRIPTION

The process will be described in connection with the drawing.

Polyethylene broke containing, for example, about 8% to 12% polyethylene by weight, preferably in a chopped and baled form, is fed into a conventional hydropulper 10 or like apparatus. In hydropulper 10, fiber of the broke is liberated from the broke, discharged through screen 11 as an aqueous slurry and, after cleanup, is reused in paper manufacture. The polyethylene content of the broke is also discharged from hydropulper 10 as a slurry. The amount of solid polyethylene in this slurry is ordinarily about 1.5% to 2% by weight. The slurry also contains some unwanted amounts of fiber.

For reasons which will be explained later, if the weight ratio of fiber to solid polyethylene in the polyethylene slurry is more than about 1:20, the slurry is conveyed, as by pipe 12, to a second hydropulper 13 where additional fiber is liberated until the fiber to polyethylene ratio of less than 1:20 is obtained.

The polyethylene slurry is then dehydrated to less than about 15%, preferably between 0% and 5% by weight of water. This step can be accomplished by simple thermal drying, but is preferably accomplished in two steps; first mechanical dewatering and then thermal drying.

Various techniques for performing these dehydration steps are available in the art. Mechanical dewatering may, for example, be achieved simply by using a set of pressure rollers, as in a conventional wet lap machine 15. This is particularly effective where the fiber content of the slurry is initially low. In a preferred embodiment, however, this step is performed by passing the slurry over a conventional dewatering screen 16. In this case, free water and small suspended fiber clumps are both removed. This mechanical treatment ordinarily produces a slurry having a solids content of between about 35 to 70% by weight.

Dewatered polyethylene may then be dehydrated further by conventional thermal means 17. A commercial tumbler-type drier using heated air is preferred for this step. Use of tumbler action and heated air flow during thermal drying separates and blows out of the mass further substantial quantities of fiber that may still be present.

For convenience of handling, it has been found that dewatered polyethylene benefits from compaction. An optional step therefore involves baling the polyethylene prior to further dehydration to less than about 15% of water by thermal drying in a conventional baler 18.

The dehydrated polyethylene is then converted into pellets. This may be done by conventional means of heating the polyethylene to plastic state, shaping or molding and then cooling to re-solidify the polyethylene. In a preferred embodiment, these steps are accomplished in a commercially available Zerglomat machine 19 by shredding the polyethylene in a heated vortex to produce a molten or plastic mass of polyethylene and then injecting a measured amount of water into the mass to explode it into uniform pellets which are collected after cooling. Further, if desired, air may be blown over the plastic mass prior to water injection to remove fibers which appear on its surface.

The polyethylene pellets are then preferably separated from attendant fiber material. This may, for example, be performed by screening in a conventional threetier screen 20. Isolated material like tapes and string are separated on the coarse, first screen; the acceptable product pellets are retained on the middle screen; and the major part of the residual fibers pass through the middle screen. The pellets may then be conveyed to storage or transported to a different location for use.

Pellets produced according to this invention can be used in the plastic industry in injecting moldings, extrusions, and the like. It is possible to do so only because the fiber content is less than 5% as noted above. Fiber weight content in a fiber to polyethylene ratio of more than 1:20 causes the polyethylene to char when being extruded, for example, and also slows extrusion rates as it tends to clog extruder openings. Also, higher fiber content makes it more difficult to dry the polyethylene.

EXAMPLE 500 pounds of polyethylene broke were fed to a hydropulper manufactured by Black Clawson Co., where defibering in the presence of water took place. The slurry of fiber exiting the hydropulper was separated for use in paper making. A separate aqueous slurry containing 2% polyethylene and 0.1% fiber was also separated.

The polyethylene containing slurry was passed over a fine screen. Free water and fiber clumps passed through the screen, resulting in a concentrated polyethylene slurry of 45% solids by weight. This slurry was then baled for thermal drying.

The baled polyethylene was dried to a moisture content of 5% in a tumbler dryer of American Laundry Machinery Co. Drying took place at a maxiumum temperature of 260° F. (110° stack temperature) and resulted in the further separation of fiber.

The polyethylene was then introduced in a Model No. PZ 1050 Process Zerglomat of Bolton-Emerson, Inc. for pelleting. In the machine, the polyethylene was heated to a plastic state while a forced current of air passed over its surface removing still more fiber. Water was then injected into the plastic polyethylene to explode it into pellets.

Material exiting the Process Zerglomat was then sieved over two differently sized screens to separate pellets from fibers released during pelleting. The product pellets were essentially fiber-free, had a density of 0.934 g/cc and exhibited a melt flow of 3.43 gram per 10 minutes at 190° C.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for the recovery of polyethylene from a mixture comprising water, polyethylene fragments and cellulosic pulp fibers, said process comprising:
   defibering said mixture in a first hydropulper to remove a first quantity of said cellulosic pulp fibers;
   thermally drying the defibered mixture in a thermal tumbler dryer to dehydrate said defibered mixture to less than about 15% water, said thermal tumbler dryer having a stream of drying air flowing therein which serves to carry away a second quantity of cellulosic pulp fibers from said defibered mixture during said drying process; and
   pelletizing the polyethylene fragments remaining in said dehydrated defibered mixture.

2. The process of claim 1 wherein prior to the thermal drying step, the defibered mixture is passed through a second hydropulper to remove an additional quantity of said cellulosic pulp fibers from said defibered mixture, thereby reducing the fiber to polyethylene content of said defibered mixture to a ratio of no more than 1:20.

3. The process of claim 1 or 2 wherein said pelletizing step comprises the steps of:
   shredding the polyethylene fragments in a heated vortex to produce a molten mass of polyethylene;
   blowing air over said molten mass to remove cellulosic pulp fibers which appear on its surface;
   injecting a measured amount of water into said mass to explode it into uniform pellets; and
   cooling said pellets so that they harden.

4. The process of claim 1 or 2 further comprising the step of partially dehydrating the defibered mixture prior to thermally drying it by passing it over a dewatering screen so as to remove water and suspended clumps of cellulosic fiber therefrom.

5. The process of claim 3 further comprising the step of partially dehydrating the defibered mixture prior to thermally drying it by passing it over a dewatering screen so as to remove water and suspended clumps of cellulosic fiber therefrom.

6. The process of claim 3 wherein said mixture of water, polyethylene fragments and cellulosic pulp fibers further comprises extraneous particulate matter, said extraneous particulate matter remaining in said mixture throughout said process and being comingled with said polyethylene pellets at the completion of said process, further comprising the step of selectively screening said polyethylene pellets to separate them from said comingled extraneous particulate matter.

* * * * *